Feb. 1, 1955 W. W. PHARIS 2,701,278

CONNECTOR CIRCUITS

Filed April 22, 1954 9 Sheets-Sheet 1

INVENTOR.
WILLIAM W. PHARIS

BY T. L. Bowes

ATTORNEY

Feb. 1, 1955 W. W. PHARIS 2,701,278

CONNECTOR CIRCUITS

Filed April 22, 1954 9 Sheets-Sheet 2

Feb. 1, 1955 W. W. PHARIS 2,701,278

CONNECTOR CIRCUITS

Filed April 22, 1954 9 Sheets-Sheet 3

Feb. 1, 1955 W. W. PHARIS 2,701,278

CONNECTOR CIRCUITS

Filed April 22, 1954 9 Sheets-Sheet 4

Feb. 1, 1955

W. W. PHARIS 2,701,278

CONNECTOR CIRCUITS

Filed April 22, 1954

9 Sheets-Sheet 5

Feb. 1, 1955 W. W. PHARIS 2,701,278

CONNECTOR CIRCUITS

Filed April 22, 1954 9 Sheets-Sheet 9

United States Patent Office 2,701,278 Patented Feb. 1, 1955

2,701,278

CONNECTOR CIRCUITS

William W. Pharis, Rochester, N. Y., assignor to Stromberg-Carlson Company, a corporation of New York Application April 22, 1954, Serial No. 424,848

3 Claims. (Cl. 179—7)

This invention relates to automatic telephone systems and more particularly to connectors provided with party line signaling facilities.

It is an object of my invention to provide a connector circuit for use in automatic telephone systems in which economy is effected by employing a single relay for performing the functions of ringing signal application to party lines and controlling conversation timing on certain types of calls.

I contemplate the use of a relay for connecting the ringing signal corresponding to a chosen party line to the ring side of the line when certain parties are called and to the tip side of the line when other parties are called depending upon whether the relay has been operated. If operated, the relay is released upon answering and then reoperated later (or operated if not previously operated and released) upon receipt of energizing potential from conversation timing apparatus to initiate timing of the call.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Figs. 1 to 8, when placed as indicated in Fig. 11, comprise a detailed schematic diagram of a connector circuit embodying the principles of my invention;

Figure 8:
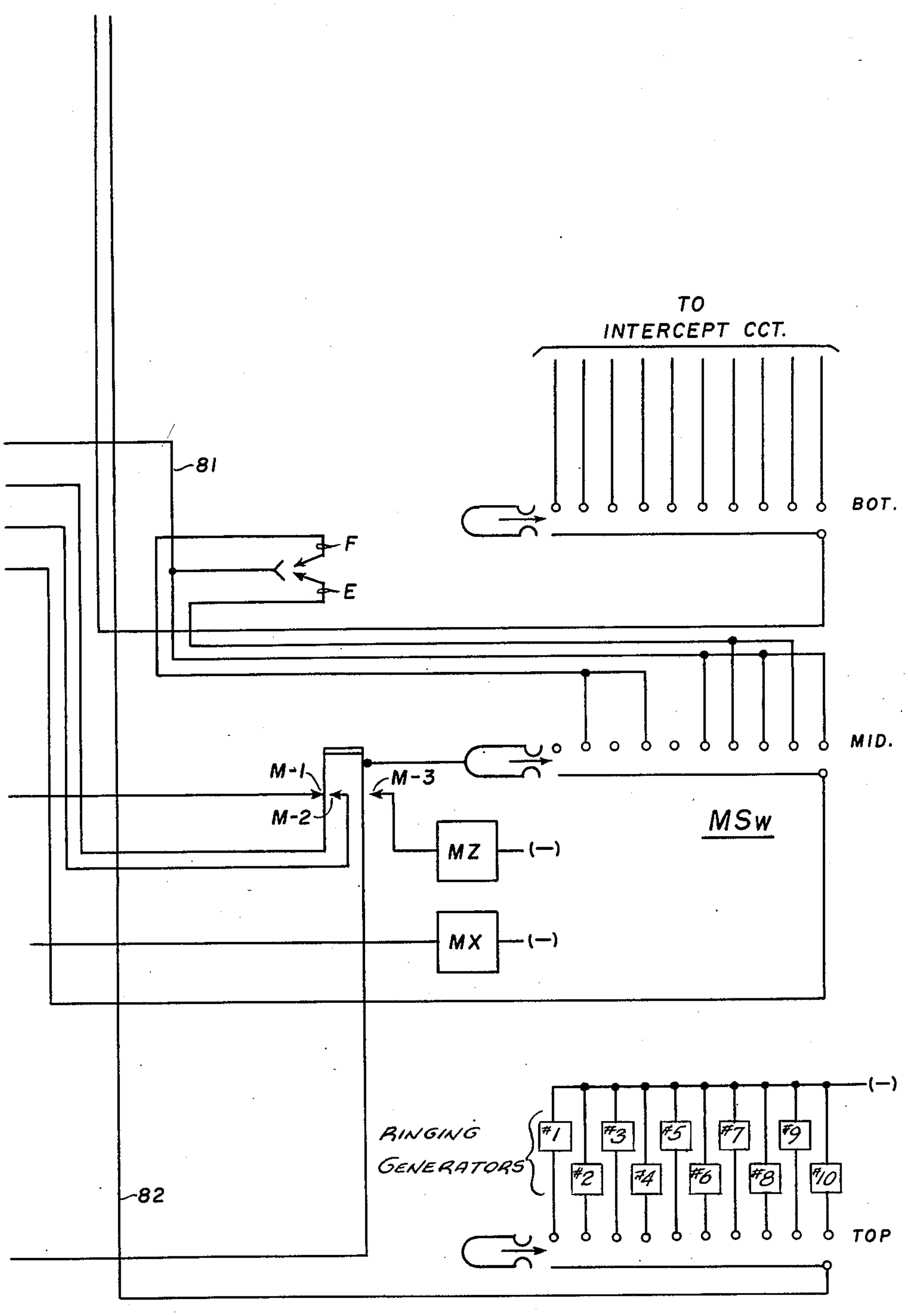
Figure 9:
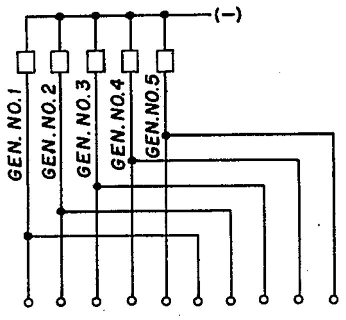
Figs. 9 and 10 illustrate alternate ringing methods.
Figure 10:
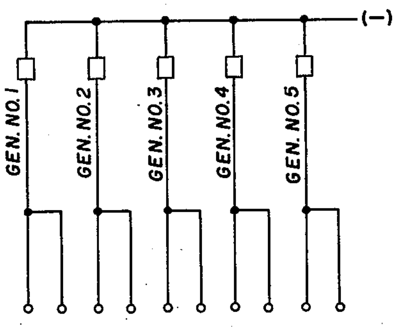
Figure 11:
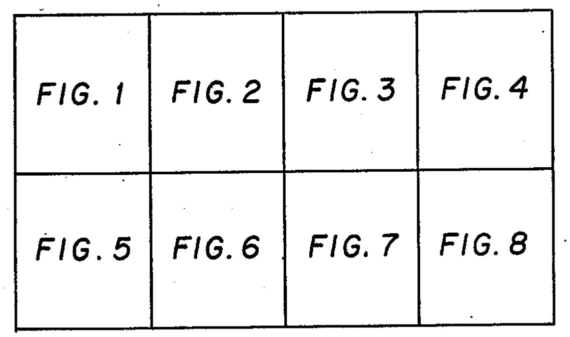

Before beginning a detailed description of the circuits disclosed in the drawings, attention is called to the fact that with the connector illustrated in this specification, ringing is automatically applied at the end of the third digit on local and toll calls, the ringing apparatus including a minor switch MS*w*. Figs. 8, 9, and 10 disclose optional wiring arrangements for the minor switch banks in order to provide 5 or 10 codes of frequencies from the ringing supply sources.

Generator leads 1 to 10, wired according to Fig. 8 when used with the "E" wiring (Fig. 8), provide for 10 code harmonic divided ringing with ringing digits 1 to 5 ringing on the ring side of the line (relay 630 unoperated) and digits 6 to 0 ringing on the tip side of the line (relay 630 operated).

When generator leads 1 to 10 are wired as shown in Fig. 8 but the "F" wiring (Fig. 8) is substituted for the "E" wiring, ringing is provided for 10 code harmonic divided ringing with the odd ringing digits ringing on the ring side of the lne (relay 630 unoperated) and the even digits ringing on the tip side of the line (relay 630 operated).

Alternative ringing systems are shown in Figs. 9 and 10 employing five frequencies which may comprise five generators. If generator leads 1 to 5 of Fig. 9 are employed with the "E" wiring, there is provided five code or harmonic bridged or ten divided harmonic ringing with the ringing digits 1 to 5 ringing on the ring side of the line and digits 6 to 0 ringing on the tip side of the line.

If, referring to Fig. 9, Fig. 9 is employed with the "F" wiring, there is provided five code or harmonic bridged or ten divided harmonic ringing with the odd ringing digits ringing on the ring side of the line and the even ringing digits ringing on the tip side of the line.

If the ring leads are connected to five generators as shown in Fig. 10, i. e., leads 1 and 2 are connected to generator 1, leads 3 and 4 are connected to generator 2, etc., together with the "F" wiring, ringing is provided for five code or harmonic bridged or ten divided harmonic ringing with the odd ringing digits ringing on the ring side of the line and the even digits ringing on the tip side of the line.

It is also noted that the "K" wiring provides direct ground on the pick-up lead PU and is used for single ring harmonic ringing, whereas the "L" wiring provides a ground pulse from the interrupter circuit and is used for five or ten code harmonic ringing.

With the connector shown herein, conversation timing starts when the called party answers if the call is forwarded from a local subscriber and warning tone is applied twice to the line at predetermined intervals before the circuit is released. In case of a toll call, however, conversation timing is canceled.

Figure 1:
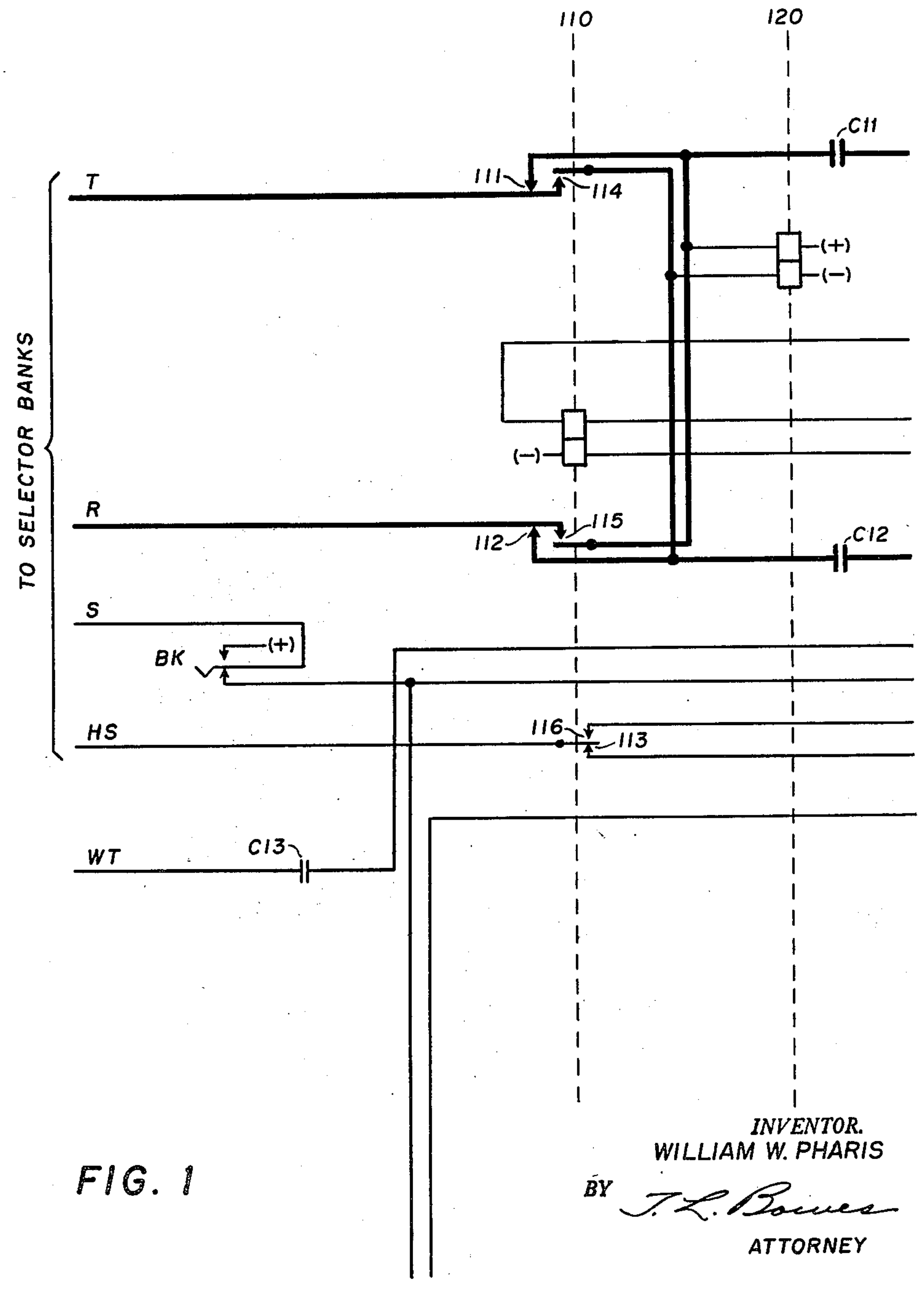
Figure 2:
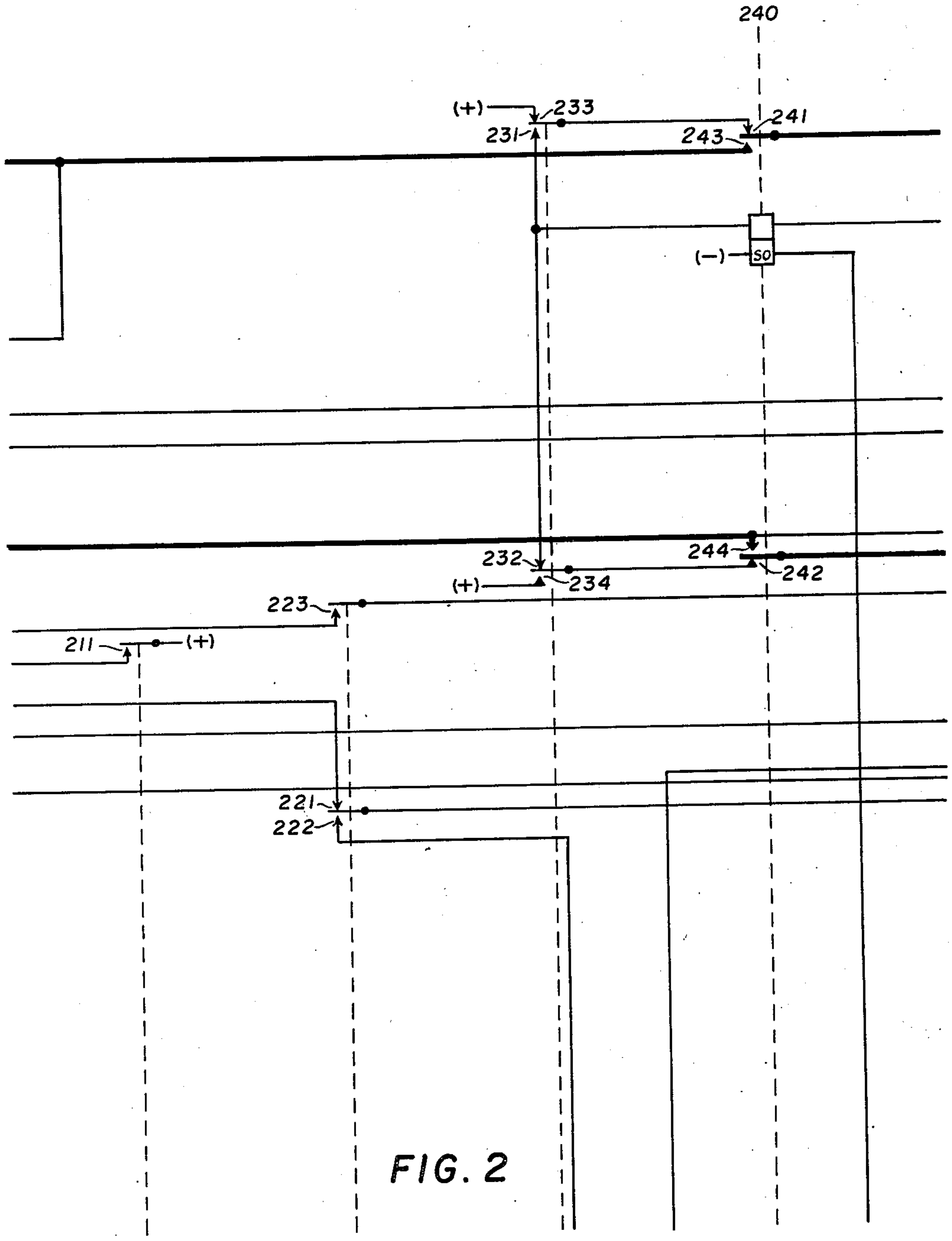
Figure 3:
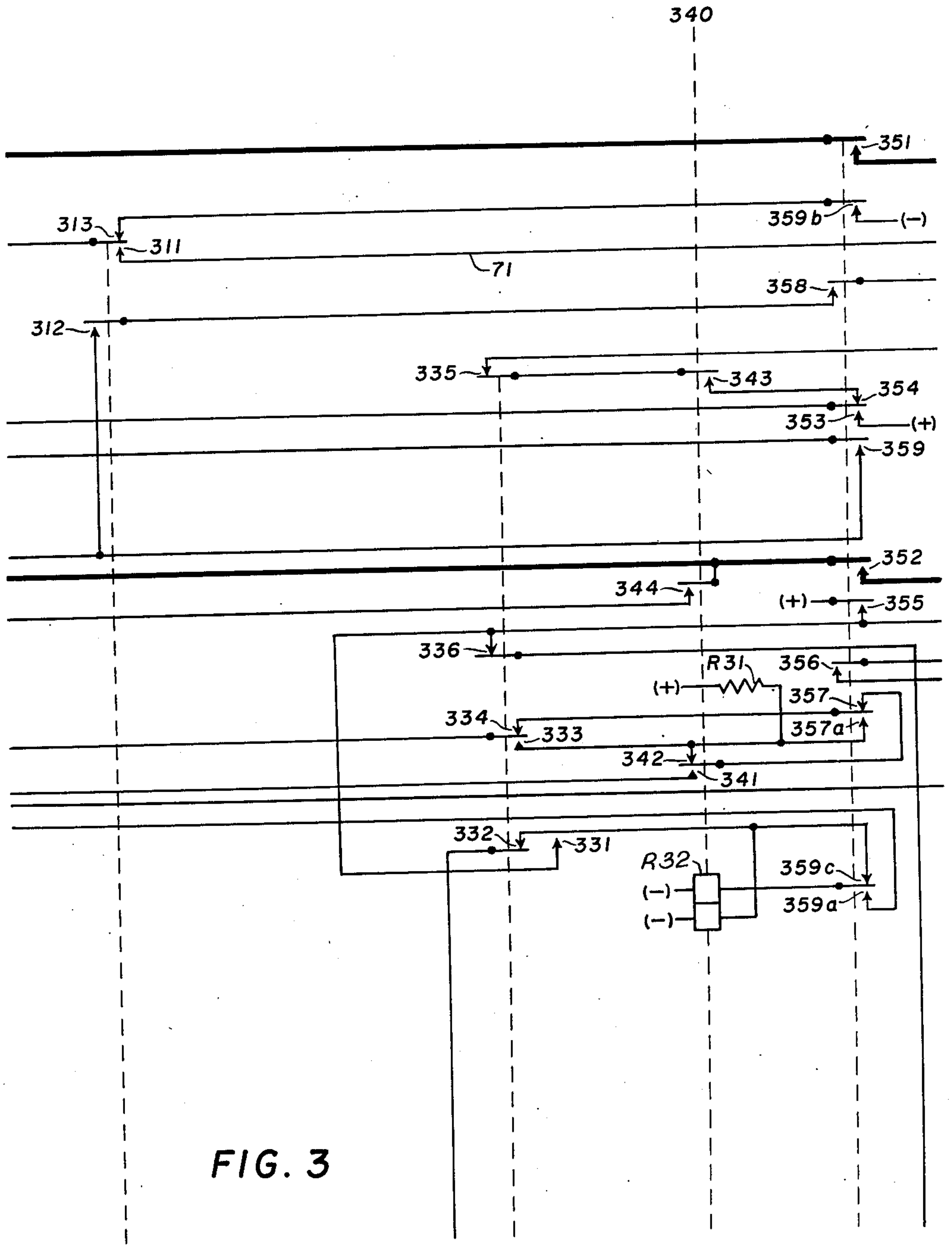
Figure 4:
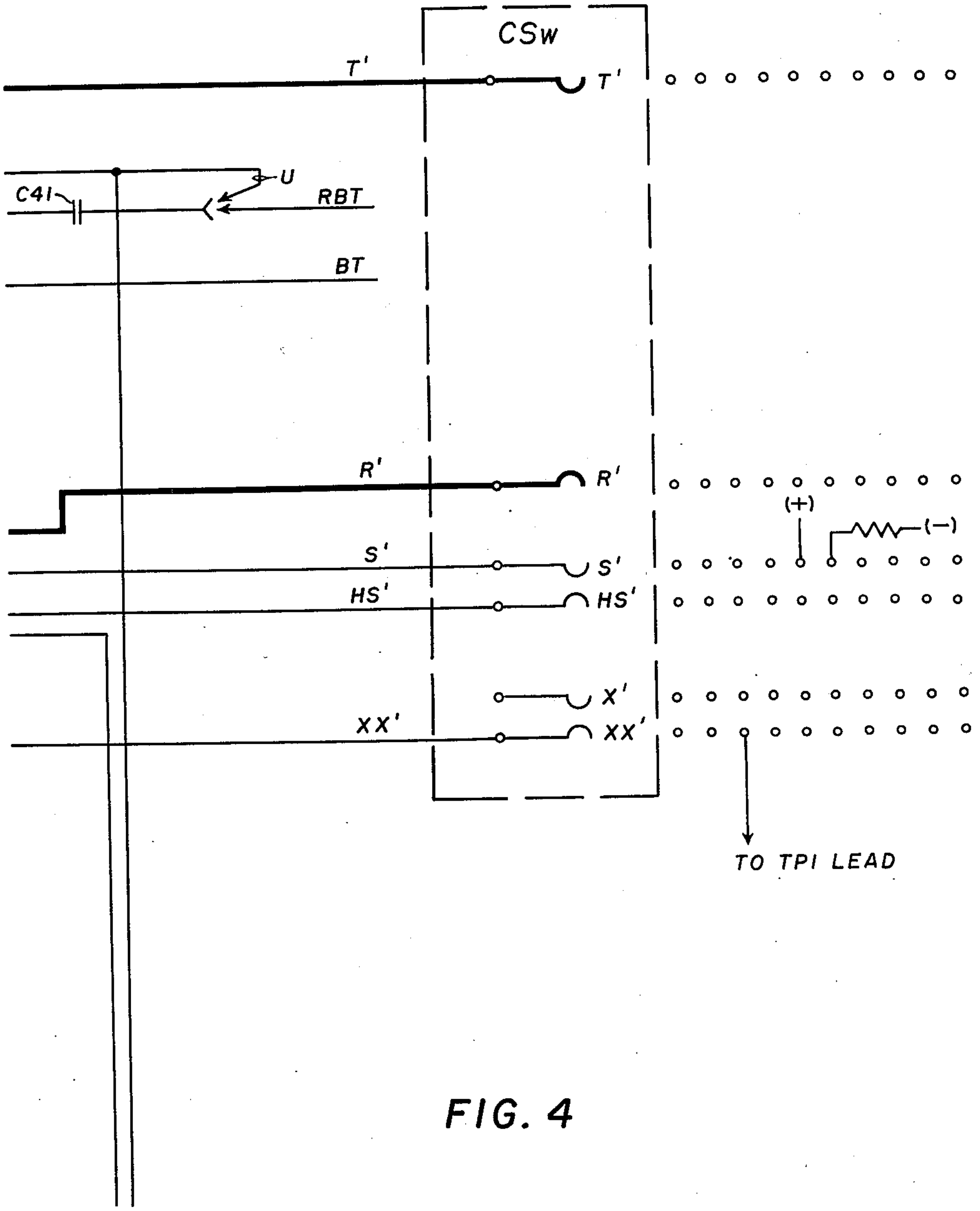

Referring to Figs. 1 to 8, inclusive, in detail, there will first be described the extension of a local call from preceding equipment, as a suitable selector, for example, to a called party line terminating in the connector banks of switch CS*w* illustrated generally in Fig. 4. When the connector shown in the drawings is seized by the preceding switch train, calling bridge relay 120 is operated in conventional manner over the calling loop including tip lead T, normal contacts 111 and the upper winding of calling bridge relay 120 to ground, and ring lead R of the calling loop through the lower winding of relay 120 to battery by way of normal contacts 112. At this point it is noted that the station battery is arranged so that the positive terminal is connected to ground and the grounded positive terminal of the battery will hereinafter be referred to as "ground." The negative terminal of the station battery will hereinafter be referred to as "battery" in accordance with conventional telephone practice.

In response to the operation of calling bridge relay 120, ground is connected to monitor lamp MON through operated contacts 521 and normal contacts 511 and a circuit is completed for energizing delay relay 610 over a circuit extending from battery through the winding of relay 610, operated contacts 522, normal contacts 621, and release magnet normal contacts Z–1 to ground.

In response to the energization of delay relay 610 over the previously described circuit, circuits are completed for extending ground to the switch-through relay 750 by way of operated contacts 611 and normal contacts 741 to the upper winding of relay 750; grounding the incoming sleeve lead S through operated contacts 211 and normal contacts of busy key BK; establishing master ground at operated contacts 613 for completing a circuit to operate X-delay relay 710 by way of X off-normal contacts XON–1, Y off-normal contacts YON–1, and the upper winding of relay 710; for energizing Y-delay relay 720 from master ground by way of Y off-normal contacts YON–2 and the upper winding of relay 720; energizing relay 730 from master ground by way of minor switch normal contacts M–1 and the upper winding of relay 730; preparing part of the impulsing path for stepping magnets X and Y (Fig. 7) at operated contacts 614; applying ground to the interrupter start lead ST through operated contacts 615 and normal contacts 642; and opening the lead RA at contacts 616.

In response to the operation of X-delay relay 710 another point is completed in the impulsing path at operated contacts 711.

In response to the operation of Y-delay relay 720 a circuit is prepared for operating ring trip relay 240 at operated contacts 721.

In response to the operation of relay 730, the pulsing path for the X-delay relay 710 through its lower winding and the primary stepping magnet X in parallel is closed at operated contacts 731.

*First digit*

The connector circuit is now ready for the receipt of the first switch directing digit. There is illustrated utilization of the step-by-step switch sold under the trade-mark "XY" which has a first or main set of brushes which may be moved in a primary direction to select a desired level of terminals and then in a secondary direction to reach a particular terminal in the selected level. This set of brushes is indicated in Fig. 4 as tip brush T′, ring brush R′, sleeve brush S′ and auxiliary brush HS′. In the particular switch referred to above, a second or auxiliary set of brushes X′ and XX′ is provided which is operable into engagement with a plurality of terminals only during the primary movement of the main set of brushes, although in the particular connector illustrated herein only the XX′ brush and corresponding contacts are employed.

The first digit dialed into the connector is employed to cause the connector switch CS*w* to move in its primary direction. On the first impulse the loop to calling bridge relay 120 is opened. Upon the restoration of relay 120 a circuit is closed at contacts 523 to the X-delay relay 710 and the primary stepping magnet X in parallel over the impulsing path including contacts 711, 731, 614, 523, 621 and Z–1, and opens the energizing circuit for delay relay 610 at now-open contacts 522. Delay relay 610 is provided with slow-to-release characteristics so that this relay remains operated until the end of the digit.

The primary stepping magnet X is operated over the previously described circuit and effects the movement of the main and auxiliary brushes of switch CS*w* one step in the primary direction, thereby operating the X-off-normal contacts. The energizing circuit for relay 710 is opened upon the first step of switch CS*w* because of the opening of the X off-normal contacts XON–1 but relay 710 is maintained operated throughout the duration of the digit by way of the lower winding of relay 710 and the impulsing circuit, this relay being of a slow-to-release type.

At the end of the first impulse of the first digit the incoming loop is reclosed to the calling bridge relay 120 whereupon relay 120 reoperates in order to reclose the energizing circuit for delay relay 610 and open the impulsing circuit to the stepping magnet X and lower winding of relay 710 at contacts 523.

The remainder of the series of dial pulses moves switch CS*w* in the primary direction of movement to the desired level. At the end of this series of impulses relay 120 remains operated. After a time delay depending upon the characteristics of relay 710, relay 710 restores and at contacts 712 prepares an impulsing circuit for the lower winding of slow-to-release relay 720 and the secondary stepping magnet Y of connector switch CS*w* in parallel. The connector is now ready to receive the second switch operating digit.

*Second digit*

Upon the receipt of the first impulse of the second digit, relay 120 releases whereby the previously described impulsing circuit for relay 720 and stepping magnet Y is completed through operated contacts 722, normal contacts 712, operated contacts 731 and 614, normal contacts 523 and 621 to ground on the release magnet contacts Z–1. The secondary stepping magnet Y operates and moves switch CS*w* one step in the secondary direction, thereby operating the Y off-normal contacts.

In response to the opening of the Y off-normal contacts YON–2, the energizing circuit for Y-delay relay 720 is opened although relay 720 remains operated through its lower winding during the period of the second digit.

At the end of the first impulse of the second digit the calling loop is again reclosed to relay 120 which operates to re-energize relay 610 and open the circuit to relay 720 and the secondary stepping magnet at contacts 523. As previously noted, relays 720 and 610 are slow-to-release and hence remain operated during the second digit. The remainder of the series of dial impulses comprising the second digit causes switch CS*w* to move in the secondary direction to the desired line. At the end of the second digit, relay 120 remains operated thereby opening the impulsing circuit to the lower winding of relay 720 and the secondary stepping magnet Y and closing the circuit for energizing relay 610 at contacts 522. After a short time delay, determined by the release characteristics of relay 720, relay 720 releases thereby providing a circuit to energize the lower winding of relay 730 and the stepping magnet MX of minor switch MS*w* in parallel at normal contacts 723. The circuit is now ready for the receipt of the third or ringing digit.

*Third digit*

Upon receipt of the first impulse of the third digit, relay 120 releases and completes an impulsing circuit to relay 730 and stepping magnet MX by way of normal contacts 723, 712, operated contacts 731 and 614 to the impulsing contacts 523. Stepping magnet MX operates to move the minor switch MS*w* one step, thereby operating the minor switch off-normal springs M–1 to open the operating circuit through the upper winding of relay 730. Relays 730 and 610, both being slow-to-release, remain operated because of their slow-to-release characteristics, but magnet MX operates on the receipt of each impulse of the third digit to move the minor switch to the desired terminal. Relay 120 upon reoperating after the last impulse of the series, opens a circuit to magnet MX and the lower winding of relay 730 at contacts 523 and recloses the energizing circuit for relay 610 at operated contacts 522. The position of switch MS*w* determines the particular ringing signal to be applied to the called line.

*Busy test*

The busy test is made at the end of the second digit. If the called line is busy, the sleeve brush S′ of the switch CS*w* encounters ground as indicated at the fifth terminal in the chosen level, thereby effecting the operation of busy test relay 340 over a circuit extending from ground on the fifth terminal of the selected level, brush S′, sleeve lead S′, operated contacts 331, and lower winding of relay 340 to battery, this circuit also being connected through normal contacts 359*c*, and the upper winding of relay 340 to battery.

In response to the operation of busy test relay 340 the future energizing circuit for switching relay 750 is opened at normal contacts 741; a circuit is prepared to the 60 I. P. M. lead at operated contacts 341 (for use in toll calls); and a circuit is prepared for applying busy tone to the tip and ring leads T and R at contacts 343. Busy tone is not applied at this time because relay 730 remains operated until the end of the third digit and hence the busy tone lead is opened at contacts 335.

Upon the restoration of relay 730 at the end of the third digit, a holding circuit for relay 340 is completed from ground through the lower winding of relay 340, normal contacts 332, operated contacts 742, and operated contacts 611 to ground; the selector auxiliary lead HS is transferred from resistance ground by way of normal contacts 113, 334, 357, and 342 to battery through resistor R31 to 60 I. P. M. battery at contacts 341; and busy tone is placed on the calling line by way of busy tone lead BT, normal contacts 335, operated contacts 342, normal contacts 354, upper winding of answer bridge relay 110, capacitor C11, and normal contacts 111 to incoming tip lead T.

When the calling party hangs up in repsonse to the receipt of busy tone, calling bridge relay 120 is released upon the opening of the incoming loop and opens the circuit for delay relay 610 at contacts 522, thereby connecting release magnet Z (Fig. 7) to ground over a circuit extending from battery through the release magnet Z, X and Y off-normal contacts in parallel, normal contacts 752, and 616 to ground on lead RA.

*Switching through*

If it be assumed that switch CS*w* reached an idle line (which would be marked by resistance battery in the sleeve bank of switch CS*w*, such marking being indicated on the sixth terminal in the level shown in Fig. 4), the busy test relay would not have been operated and the switching relay 750 operates from resistance battery on the sleeve lead by way of normal contacts 336, upper winding of relay 750, normal contacts 741, to ground at contacts 611 at the time that relay 730 restores shortly after the end of the third digit.

Figure 5:
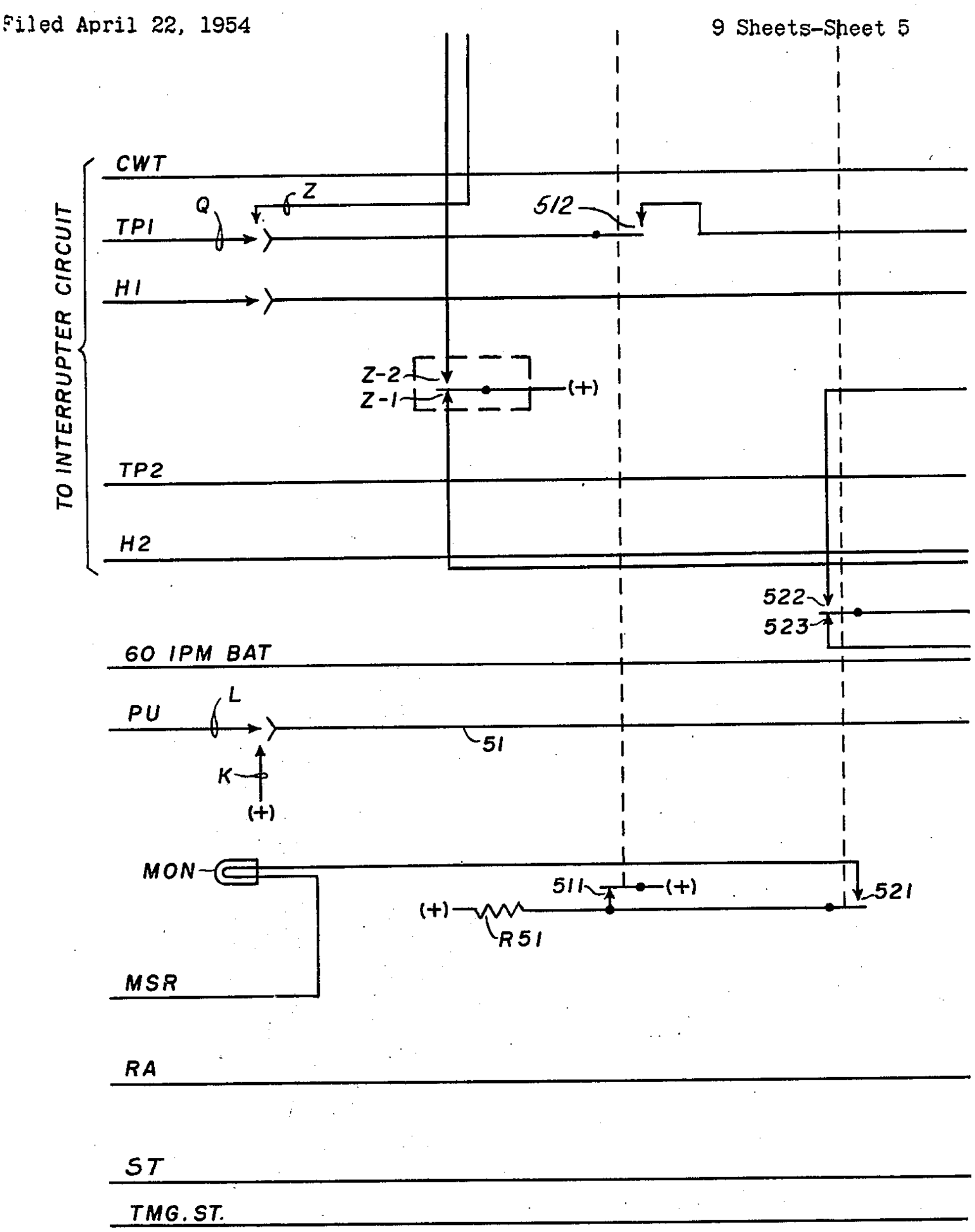
Figure 6:
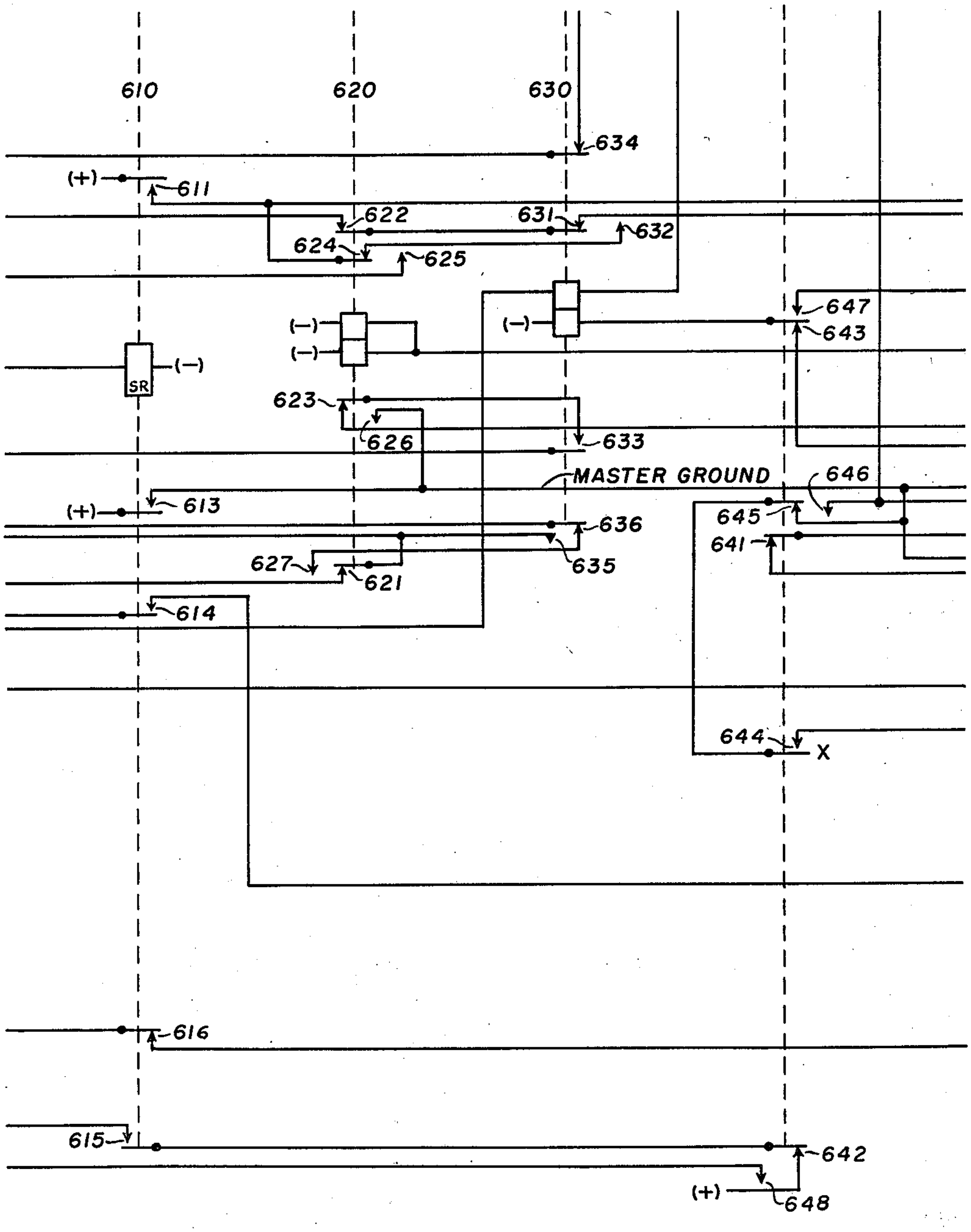
Figure 7:
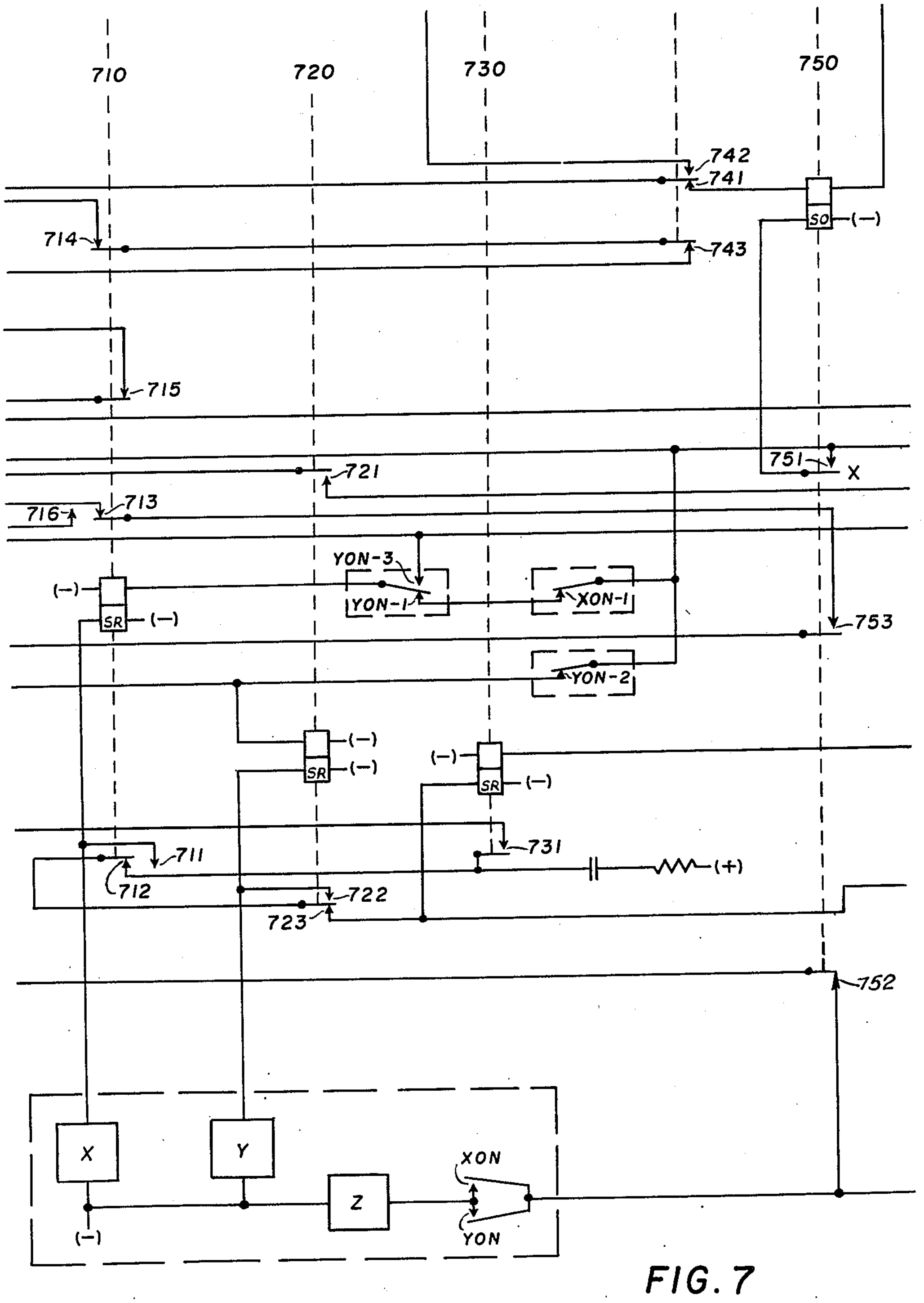

Relay 750, when it operates, closes a locking circuit for itself from master ground by way of operated contacts 751 through its lower winding to battery; connects the outgoing tip and ring leads T′ and R′ through to the wiper bank at contacts 351 and 352, respectively; opens lead RA at contacts 752; and closes a circuit for re-energizing X-delay relay 710 from ground directly applied to lead 51 through operated contacts 753, normal contacts 713 and 641, operated Y off-normal contacts YON–3 and the upper winding of relay 710 to battery if wiring "K" of Fig. 5 is used, or from ground on the pick-up lead PU if wiring "L" is used; connects ground to the right hand terminal of the upper winding of answer bridge relay 110 through operated contacts 353; connects the lower winding of combination ring reversing and conversation timing relay 630 to master ground through normal contacts 643, conductor 81, sixth terminal of the mid bank of minor switch MS*w*, normal contacts 641 and operated contacts 716; grounds the front sleeve lead S' at contacts 355; and closes the front auxiliary lead HS' to bank BOT of minor switch MS*w* by way of operated contacts 356 for intercept purposes.

At this point it is noted that relay 630 is operated to apply ringing signals to tip lead T' but is permitted to remain unoperated to apply ringing signals to ring lead R'. With the arrangement of Fig. 8, when the ringing digit is 6, 8 or 10 the corresponding terminals of bank MID are connected directly to conductor 81. If the ringing digit is 2 or 4, the mid bank terminals are connected to conductor 81 by way of the "F" wiring. Hence, relay 630 is operated on "even" digits. Relay 630 is unoperated on "odd" digits, i. e., terminals 1, 3 and 5 are dead and terminals 7 and 9 are open with "F" wiring and hence relay 630 cannot be energized.

*Ringing*

As noted above, ground on pick-up lead PU (or direct ground on lead 51) completes a circuit for reoperating X-delay relay 710 and for operating relay 630 through the dialed step of the minor switch section MID over the circuit previously described.

In response to the reoperation of relay 710 over this circuit, either the tip or the ring lead is grounded depending upon whether relay 630 is operated or not and extends the generator lead of the dialed digit from bank TOP of minor switch MS*w* to the tip or ring side of the line. With the arrangement shown in Fig. 8 and assuming use of the "F" wiring, the odd ringing digits ring on the ring side of the line and the even digits ring on the tip side of the line. Assuming that the ringing digit is even, relay 630 is operated and the ringing voltage applied through section TOP of the minor switch (Gen. 6 in the present example) is conducted to the called station through conductor 82, operated contacts 311, upper winding of ring trip relay 240, operated contacts 231, normal contacts 241, and operated contacts 351 to the forward tip lead T'. If an odd ringing digit is employed, the energizing circuit for relay 630 is open at section MID of minor switch MS*w* and the ringing voltage is then applied to forward ring lead R' through operated contacts 311, normal contacts 232, normal contacts 242, and operated contacts 352. The conversation timing relay 630 thus is employed as a ring reversing relay.

The reoperation of relay 710 also closes a circuit for extending ring back tone back to the calling party from ring back lead RBT through capacitor C41, operated contacts 358, operated contacts 312, capacitor C12, and normal contacts 112 to incoming ring lead R; locks to master ground by way of operated Y off-normal contacts YON–3, normal contacts 641, and operated transfer contacts 716.

If the called party should happen to answer before application of ringing signal, ring trip relay 240 is operated from battery through contacts **359*b*, 313, upper winding of relay 240, contacts 231, 241, 351, loop, contacts 352, 242 and 234** to ground, thereby preventing ringing.

*Called party answers*

When the called party answers by removing his handset or telephone from its cradle, two-step ring trip relay 240 is operated over the direct current path through the outgoing loop over a circuit extending from battery through the selected ringing generator, section TOP of minor switch MS*w*, conductor 82, conductor 71, operated contacts 311, upper winding of ring trip relay 240 and, assuming that the ringing digit is such as to effect the operation of relay 630 through operated contacts 231, normal contacts 241, operated contacts 351, forward loop, operated contacts 352, normal contacts 242 and operated contacts 234 to ground, thereby closing its preliminary contacts 644.

In response to the closing of contacts 644, Y-delay relay 720 is reoperated over a circuit extending from battery through the upper winding of relay 720, preliminarily operated contacts 644 and normal contacts 645 to master ground.

In response to the reoperation of relay 720, a circuit is completed for fully operating ring trip relay 240 from battery through its lower winding, operated contacts 721, minor switch off-normal contacts M–2 to master ground.

Ring trip relay 240 upon fully operating, locks to master ground through operated contacts 646; trips ringing at operated contacts 243 or 244 as the case may be; opens the locking circuit for relay 630 at contacts 643; opens the locking circuit for relay 710 at now-open contacts 641 in order to remove ring back tone at contacts 312 upon release of relay 710; opens the re-energizing circuit for relay 720 at now-open contacts 645; removes ground from the start lead ST at normal contacts 642; grounds the timing start lead TMG ST at operated contacts 648; closes the tip and ring leads of the called party to the talking condensers C11 and C12 at operated contacts 243 and 244, respectively; and connects answer bridge relay 110 to the ring and tip leads R' and T', respectively.

Answer bridge relay 110 operates over the closed loop, the lower winding being connected from battery to the ring side of the line through its lower winding, operated contacts 359, 244 and 352, and the upper winding being connected from ground to the tip side of the line over a circuit extending from the tip lead T' through operated contacts 351 and 241, upper winding of relay 110 and contacts 353 thereby connecting reverse battery to the calling line for supervision at operated contacts 114 and 115; transferring the back auxiliary lead HS from resistance ground through normal contacts 113, 334, 357, 342, and resistor R31 to resistance battery through operated contacts 116, normal contacts 221, operated contacts **359*a* and resistance R32, the upper winding of relay 340 serving as a resistance; transferring lead MSR from direct ground through monitor lamp MON and operated contacts 521** to resistance ground through resistor R51, thereby providing a dim lamp during conversation.

In response to the previous operation of ring trip relay 210, relay 720 was de-energized at contacts 645, as noted above, and releases after a time delay determined by its operating characteristics. Conversation can now take place.

*Conversation timing*

The above-noted release of relay 710 connects timing lead TP1 by way of the "Q" wiring, operated contacts 512, normal contacts 622, normal contacts 631, normal contacts 714, normal contacts 743, and operated contacts 647 to the lower winding of relay 630.

The conversation timing feature disclosed herein requires the "Q" wiring indicated in Fig. 5 in order to connect lead TP1 to the connector.

Figure 12:
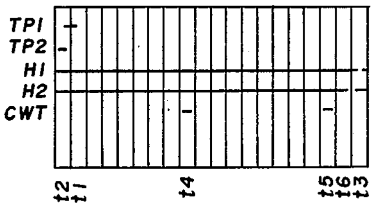
Fig. 12 is a timing chart illustrating timing in connection with the conversation timing feature.

Conversation timing is initiated by the appearance of a ground pulse (at time *t*–1 in Fig. 12) on lead TP1 following answering by the called party thereby providing potential for operating relay 630 as a conversation timing control relay over a circuit extending from battery through the lower winding of relay 630, operated contacts 647, normal contacts 743, 714, 631, and 622, and operated contacts 117 to lead TP1.

In response to the operation of conversation timing relay 630, there is completed a holding circuit through the lower winding of relay 630, operated contacts 647, normal contacts 743 and 714, operated contacts 632, normal contacts 624 and operated contacts 611 to ground; timing lead TP2 is connected to the windings of relay 620 by way of operated contacts 633, normal contacts 623 and 715.

After a predetermined length of time (at time *t*–2 in Fig. 12) a ground pulse appearing on lead TP2 energizes relay 620. In response to the operation of relay 620 a locking circuit is completed from the lower winding through normal contacts 715 and operated transfer contacts 626 to master ground, the original energizing circuit being broken at contacts 623; the holding circuit for conversation timing relay 630 is transferred to control of ground on hold lead H1 at operated contacts 625 by way of operated contacts 632, normal contacts 714 and 743 and operated contacts 647 to the lower winding of relay 630; lead TP1 is opened at contacts 622; a circuit is prepared for operating busy test relay 340 at operated contacts 222; a circuit is prepared for the application of warning tone from lead WT to the talking circuit at contacts 223; and a holding circuit for delay relay 610 is prepared from ground on hold lead H2 at operated contacts 627. When ground is removed momentarily from lead H1 a predetermined time later (*t*–3 of Fig. 12), relay 630 is de-energized and restores.

Responsive to the restoration of relay 630, lead CWT is connected to busy test relay 340 by way of normal contacts 634, operated contacts 222, and operated contacts 359*a*; and a holding circuit for relay 610 is completed from lead H2 at contacts 636.

After a predetermined interval of time a ground pulse appears on lead CWT (time *t*–4) whereupon relay 340 operates.

Responsive to the operation of relay 340, warning tone on lead WT is connected to the talking circuit through capacitor C13, operated contacts 223 and 344 to ring leads R and R'. When the ground pulse is removed from lead CWT, relay 340 restores to remove the warning tone from the ring lead. After another short interval of time another ground pulse appears on lead CWT (time *t*–5) whereupon relay 340 is reoperated to re-connect warning tone to the talking circuit. Ground is again removed, shortly thereafter, from lead CWT to again release relay 340 and to remove warning tone from the talking circuit.

A predetermined time thereafter (time *t*–6), ground is momentarily removed from lead H2 thereby opening the holding circuit for delay relay 610 which, upon restoration, removes ground from the back sleeve lead S which allows the preceding equipment to restore.

Following restoration of the preceding equipment, calling bridge relay 120 is released by the opening of the loop. Restoration of delay relay 610 opens the master ground circuit at contacts 613; and prepares a partial path to lead RA at normal contacts 616. Responsive to the disappearance of master ground ring trip relay 240 restores, removing ground from lead TMG ST and opening the circuit for relay 110 at contacts 243.

In response to the restoration of answer bridge relay 110, normal battery is returned on the tip and ring leads T and R at contacts 111 and 112 and the selector auxiliary lead HS is transferred from resistance battery to resistance ground at normal contacts 113.

Also responsive to the disappearance of master ground, switching relay 750 restores to remove ground from the forward sleeve lead S' at contacts 355; open the tip and ring wiper leads T' and R' at contacts 352 and 351, respectively; close a circuit to the RA lead from the release magnet Z (Fig. 7) through X and Y off-normal contacts in parallel, normal contacts 752 and 616; and open the lead PU at contacts 753.

The release magnet Z of connector switch CS*w* operates from ground on lead RA, thereby releasing the switch and operating the Z magnet contacts Z–2 (Fig. 5) to connect ground to the back sleeve lead S through contacts Z–2 and normal contacts of busy key BK in order to busy the connector circuit during the release time of switch CS*w*. When switch CS*w* returns to normal, the X and Y off-normal springs restore and open the circuit to magnet Z which thereupon restores. Upon restoration of magnet Z off-normal contacts Z–2 are opened to remove ground from the back sleeve lead S.

A circuit is now available for other calls.

*Conversation timing for specific levels*

When conversation timing is desired only in specific levels as for example the third level of switch CS*w*, XX contacts corresponding to that level are connected to lead TP1 as indicated by the legend in Fig. 4 and the "Z" wiring (Fig. 5) is used and the circuit functions as described above, except that when the called party answers, the energizing circuit for conversation timing relay 630 is completed from ground on TP1, terminal in the XX' bank of switch CS*w*, brush XX', Z wiring, operated contacts 512, normal contacts 622, 631, 714, 743, and operated contacts 647 to the lower winding of relay 630. The timing function is carried out in the same manner as previously described.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a telephone system a calling line, a party line, a pair of talking conductors connected to said party line, means for extending a call from said calling line to said talking conductors, a plurality of ringing signals, means associated with said calling line for transmitting a ringing digit, a relay, means for operating said relay only in response to certain predetermined values of ringing digit, means responsive to answering by the called party for releasing said relay, means responsive to the release of said relay for preparing a circuit for reoperating said relay, said circuit including a timing lead, means for thereafter applying a predetermined potential to said lead for reoperating said relay over said circuit, and means responsive to the reoperation of said relay for instituting timing of conversation over said extended connection.

2. In a telephone system a calling line, a party line, a pair of talking conductors connected to said party line, means for extending a call from said calling line to said talking conductors, a plurality of ringing signals, means associated with said calling line for transmitting a ringing digit, a relay, means for operating said relay only in response to certain predetermined values of ringing digit, means utilizing said relay for connecting a ringing signal to one side of said talking conductors when said relay is operated and to the other talking conductor when said relay is unoperated, means responsive to answering by the called party for releasing said relay if said relay was previously operated, means responsive to the release of said relay for preparing a circuit for reoperating said relay, said circuit including a timing lead, means for thereafter applying a predetermined potential to said lead for reoperating said relay over said circuit, and means responsive to the reoperation of said relay for instituting timing of conversation over said extended connection.

3. In a telephone system a calling line; a party line, a pair of talking conductors connected to said party line; means for extending a call from said calling line to said talking conductors, a plurality of signals, means associated with said calling line for transmitting a ringing digit, a minor switch, means responsive to the receipt of said ringing digit for operating said minor switch to select a ringing signal corresponding to the called station identified by said ringing digit, a relay, means for operating said relay in certain predetermined positions of said minor switch, said relay remaining unoperated in the remaining positions of said minor switch, means responsive to an operated condition of said relay for connecting the selected ringing signal to one of said talking conductors, means responsive to an unoperated condition of said relay for connecting said selected ringing signal to the other of said talking conductors, means responsive to answering by the called party for releasing said relay if said relay was previously operated, means responsive to the release of said relay for preparing a circuit for reoperating said relay, said circuit including a timing lead, means for thereafter applying a predetermined potential to said lead for reoperating said relay over said circuit, and means responsive to the reoperation of said relay for instituting timing of conversation over said extended connection.

No references cited.